(12) United States Patent
Py (10) Patent No.: US 8,376,189 B2
(45) Date of Patent: Feb. 19, 2013

(54) DISPENSING MACHINE VALVE AND METHOD

(75) Inventor: Daniel Py, Larchmont, NY (US)

(73) Assignee: ALPS LLC, New Milford, CT (US)

( * ) Notice: Subject to any disclaimer, the term of this patent is extended or adjusted under 35 U.S.C. 154(b) by 98 days.

(21) Appl. No.: 13/102,884

(22) Filed: May 6, 2011

(65) Prior Publication Data

US 2011/0272033 A1 Nov. 10, 2011

Related U.S. Application Data

(60) Provisional application No. 61/332,551, filed on May 7, 2010.

(51) Int. Cl.
*B67D 7/78* (2010.01)

(52) U.S. Cl. ......... 222/145.5; 222/1; 222/105; 222/148; 222/207; 222/212; 222/491; 222/494; 137/853; 141/90

(58) Field of Classification Search ................ 222/1, 95, 222/105, 145.5, 148–149, 207, 209, 212–215, 222/490–491, 494; 137/853; 141/90; 251/15; 417/472; 239/104, 106, 107, 110, 112–113
See application file for complete search history.

(56) References Cited

U.S. PATENT DOCUMENTS

| | | |
|---|---|---|
| 1,392,600 A | 10/1921 | Rose |
| 2,014,881 A | 9/1935 | Carlstrom |
| 2,317,270 A | 4/1943 | Harris |
| 2,471,852 A | 5/1949 | Bau |
| 2,715,980 A | 8/1955 | Frick |
| 3,160,329 A | 12/1964 | Radic et al. |
| 3,173,579 A | 3/1965 | Curie et al. |

(Continued)

FOREIGN PATENT DOCUMENTS

| | | |
|---|---|---|
| CA | 1123792 | 5/1982 |
| CN | 2436454 | 6/2001 |

(Continued)

OTHER PUBLICATIONS

International Search Report and Written Opinion of the International Searching Authority for International Application No. PCT/US2011/035630, mailed Aug. 15, 2011.

*Primary Examiner* — Frederick C. Nicolas
(74) *Attorney, Agent, or Firm* — McCarter & English, LLP (57) ABSTRACT

A one-way valve is connectable in fluid communication with a fluid-receiving chamber, such as a dilution chamber or a mixing chamber for diluting or mixing a perishable food product, such as a milk product or chocolate product, and forming a substantially fluid-tight seal therebetween. The valve comprises a relatively rigid valve seat, and a relatively flexible valve member overlying the valve seat and forming an axially-elongated, normally-closed valve opening therebetween defining an inlet at one end of the valve seat, an outlet at an opposite end of the valve seat, and an axially-extending seal therebetween that forms a fluid-tight seal between the inlet and outlet of the normally-closed valve opening. An axially-extending valve body is radially spaced relative to the valve member and forms a space therebetween allowing fluid-flow therethrough for cleaning the valve and the fluid-receiving chamber. A seal is engageable with the fluid-receiving chamber and forms a substantially fluid-tight seal therebetween to seal the valve outlet and fluid-receiving chamber with respect to ambient atmosphere. The valve member is movable radially away from the valve seat in response to substance at the inlet to the valve opening exceeding a valve opening pressure to flow into the normally closed valve opening, through the outlet, and into the fluid-receiving chamber.

40 Claims, 7 Drawing Sheets

U.S. PATENT DOCUMENTS

| | | |
|---|---|---|
| 3,180,374 A | 4/1965 | Muller |
| 3,231,149 A | 1/1966 | Yuza |
| 3,499,582 A | 3/1970 | Berney |
| 3,820,689 A | 6/1974 | Cocita |
| 3,987,938 A | 10/1976 | Cooprider et al. |
| 4,015,752 A | 4/1977 | Meuresch et al. |
| 4,078,705 A | 3/1978 | Butcher |
| 4,099,651 A | 7/1978 | Von Winckelmann |
| 4,128,349 A | 12/1978 | Del Bon |
| 4,137,930 A | 2/1979 | Scholle |
| 4,168,020 A | 9/1979 | Benson |
| 4,216,236 A | 8/1980 | Mueller et al. |
| 4,218,014 A * | 8/1980 | Tracy ............................ 239/106 |
| 4,239,132 A | 12/1980 | Mueller et al. |
| 4,249,675 A | 2/1981 | Nilson |
| 4,256,242 A | 3/1981 | Christine |
| 4,349,133 A | 9/1982 | Christine |
| 4,358,029 A * | 11/1982 | Yomoda ......................... 222/133 |
| 4,366,912 A | 1/1983 | Matakura et al. |
| 4,401,239 A | 8/1983 | Thomassen |
| 4,420,100 A | 12/1983 | Mueller |
| 4,425,366 A | 1/1984 | Sozzie et al. |
| 4,425,698 A | 1/1984 | Petrie |
| 4,513,889 A | 4/1985 | Beard |
| 4,520,948 A | 6/1985 | Hampel et al. |
| 4,526,294 A | 7/1985 | Hirschmann et al. |
| 4,561,571 A | 12/1985 | Chen |
| 4,607,764 A | 8/1986 | Christine |
| 4,660,737 A | 4/1987 | Green et al. |
| 4,667,854 A | 5/1987 | McDermott et al. |
| 4,776,495 A | 10/1988 | Vignot |
| 4,823,990 A | 4/1989 | Roggenburg et al. |
| 4,854,483 A | 8/1989 | Haggart |
| 4,981,479 A | 1/1991 | Py |
| 5,033,647 A | 7/1991 | Smith et al. |
| 5,074,440 A | 12/1991 | Clements et al. |
| 5,099,885 A | 3/1992 | Nilsson |
| 5,108,007 A | 4/1992 | Smith et al. |
| 5,145,083 A | 9/1992 | Takahashi |
| 5,176,510 A | 1/1993 | Nilsson |
| 5,178,300 A | 1/1993 | Haviv et al. |
| 5,226,565 A * | 7/1993 | Hladis et al. .................. 222/148 |
| 5,226,568 A | 7/1993 | Newton et al. |
| 5,238,153 A | 8/1993 | Castillo et al. |
| 5,267,986 A | 12/1993 | Py |
| 5,271,513 A | 12/1993 | Crosner et al. |
| 5,332,121 A | 7/1994 | Schmidt et al. |
| 5,360,145 A | 11/1994 | Gueret |
| 5,401,259 A | 3/1995 | Py |
| 5,409,146 A | 4/1995 | Hazard et al. |
| 5,429,254 A | 7/1995 | Christine |
| 5,435,463 A | 7/1995 | Hodgson |
| 5,452,826 A | 9/1995 | Stern |
| 5,453,096 A | 9/1995 | Lataix |
| 5,454,488 A | 10/1995 | Geier |
| 5,464,125 A | 11/1995 | Daansen |
| RE35,187 E | 3/1996 | Gortz |
| 5,499,758 A | 3/1996 | McCann et al. |
| 5,551,483 A | 9/1996 | Hochstrasser |
| 5,617,976 A | 4/1997 | Gueret |
| 5,641,004 A | 6/1997 | Py |
| 5,664,705 A | 9/1997 | Stolper |
| 5,685,869 A | 11/1997 | Py |
| 5,687,882 A | 11/1997 | Mueller |
| 5,697,532 A | 12/1997 | Wilde et al. |
| 5,772,079 A | 6/1998 | Gueret |
| 5,803,311 A | 9/1998 | Fuchs |
| 5,836,484 A | 11/1998 | Gerber |
| 5,842,321 A | 12/1998 | Jones |
| 5,857,595 A | 1/1999 | Nilson |
| 5,875,931 A | 3/1999 | Py |
| 5,931,386 A | 8/1999 | Jouillat |
| 5,944,702 A | 8/1999 | Py |
| 5,971,224 A | 10/1999 | Garibaldi |
| RE36,410 E | 11/1999 | Meshberg |
| 5,996,845 A | 12/1999 | Chen |
| 6,003,733 A | 12/1999 | Wheeler |
| 6,024,252 A | 2/2000 | Clyde |
| 6,033,384 A | 3/2000 | Py |
| 6,062,430 A | 5/2000 | Fuchs |
| 6,092,695 A | 7/2000 | Loeffler |
| 6,149,957 A | 11/2000 | Mandalis et al. |
| 6,170,715 B1 | 1/2001 | Evans |
| 6,182,698 B1 | 2/2001 | Barak |
| 6,216,916 B1 | 4/2001 | Maddox et al. |
| 6,254,579 B1 | 7/2001 | Cogger et al. |
| 6,325,253 B1 | 12/2001 | Robinson |
| 6,386,395 B1 | 5/2002 | Lunghetti |
| 6,450,994 B1 | 9/2002 | Boyles et al. |
| 6,455,093 B1 | 9/2002 | Furrer et al. |
| 6,471,095 B1 | 10/2002 | Cann |
| 6,491,189 B2 | 12/2002 | Friedman |
| 6,524,287 B1 | 2/2003 | Cogger |
| 6,547,108 B2 | 4/2003 | Johanson |
| 6,561,383 B1 | 5/2003 | Reddy et al. |
| 6,592,918 B2 | 7/2003 | Kaeser |
| 6,592,922 B2 | 7/2003 | Furrer et al. |
| 6,662,977 B2 | 12/2003 | Gerber et al. |
| 6,682,002 B2 * | 1/2004 | Kyotani ......................... 239/318 |
| 6,695,173 B1 | 2/2004 | Fontana |
| 6,698,628 B2 | 3/2004 | Mascitelli |
| 6,742,680 B2 | 6/2004 | Friedman |
| 6,755,327 B1 | 6/2004 | Hazard et al. |
| D493,366 S | 7/2004 | Rackwitz |
| 6,758,620 B1 | 7/2004 | Harrold |
| 6,761,286 B2 | 7/2004 | Py et al. |
| 6,769,627 B2 | 8/2004 | Carhuff et al. |
| 6,802,436 B2 | 10/2004 | Drennow et al. |
| 6,883,222 B2 | 4/2005 | Landau |
| 6,892,906 B2 | 5/2005 | Py et al. |
| 6,971,553 B2 | 12/2005 | Brennan et al. |
| 7,278,553 B2 | 10/2007 | Py |
| 7,322,491 B2 | 1/2008 | Py et al. |
| 7,347,345 B2 * | 3/2008 | Guerrero et al. .............. 222/148 |
| 7,694,850 B2 * | 4/2010 | Guerrero et al. .................. 222/1 |
| 7,810,677 B2 | 10/2010 | Py et al. |
| 7,850,051 B2 | 12/2010 | Py et al. |
| 2001/0027827 A1 | 10/2001 | Jeannin et al. |
| 2002/0050301 A1 | 5/2002 | Jeannin et al. |
| 2002/0074362 A1 | 6/2002 | Py et al. |
| 2002/0121527 A1 | 9/2002 | Good |
| 2002/0124907 A1 | 9/2002 | Crossdale et al. |
| 2003/0012858 A1 | 1/2003 | Furrer et al. |
| 2003/0082070 A1 | 5/2003 | Liberto et al. |
| 2004/0011820 A1 | 1/2004 | Abergel et al. |
| 2004/0118291 A1 | 6/2004 | Carhuff et al. |
| 2004/0118432 A1 | 6/2004 | Kenowski et al. |
| 2004/0194811 A1 | 10/2004 | Carhuff et al. |
| 2005/0029307 A1 | 2/2005 | Py et al. |
| 2005/0072480 A1 | 4/2005 | Brandes |
| 2005/0089358 A1 | 4/2005 | Py et al. |
| 2005/0165368 A1 | 7/2005 | Py et al. |
| 2006/0169722 A1 | 8/2006 | Py et al. |
| 2008/0149191 A1 | 6/2008 | Py et al. |

FOREIGN PATENT DOCUMENTS

| | | |
|---|---|---|
| CN | 1489542 A | 4/2004 |
| EP | 0172711 | 2/1986 |
| EP | 0616141 | 9/1994 |
| EP | 0649795 | 4/1995 |
| EP | 0733559 | 9/1996 |
| EP | 0743263 | 11/1996 |
| EP | 1546021 | 6/2005 |
| EP | 0802827 | 10/2007 |
| FR | 2709733 | 3/1995 |
| GB | 190300710 A | 0/1903 |
| JP | S52-91345 A1 | 7/1977 |
| JP | S59-10986 | 4/1984 |
| JP | H2-21078 | 6/1990 |
| JP | 06-239379 | 8/1994 |
| JP | 07-125799 | 5/1995 |
| JP | 10-156269 | 6/1998 |
| JP | 2002-347812 | 12/2002 |
| JP | 05-016950 | 1/2003 |
| JP | 2005-535530 | 11/2005 |
| WO | WO 91/14467 | 10/1991 |
| WO | WO 93/16955 | 9/1993 |

| | | |   | | | |
|---|---|---|---|---|---|---|
| WO | WO 94/15120 | 7/1994 | | WO | WO 02/40122 | 5/2002 |
| WO | WO 95/34381 | 12/1995 | | WO | WO 03/033363 | 4/2003 |
| WO | WO 99/32185 | 7/1999 | | WO | WO 2004/071878 A2 | 8/2004 |
| WO | WO 99/41158 | 8/1999 | | | | |
| WO | WO 00/29192 | 5/2000 | | * cited by examiner | | |

DISPENSING MACHINE VALVE AND METHOD

CROSS REFERENCE TO RELATED APPLICATIONS

This application claims the benefit under 35 U.S.C. §119(e) of U.S. Provisional Application No. 61/332,551 filed May 7, 2010, which is hereby incorporated by reference in their entirety as part of the present disclosure as if fully set forth herein.

FIELD OF THE INVENTION

The present invention relates to one-way valves, and more particularly, to one-way valves that can be used in dispensing apparatus to deliver products, such as perishable food products, from reservoirs while aseptically storing the unused product to allow, for example, for prolonged shelf-life without requiring refrigeration.

BACKGROUND INFORMATION

Aseptic packaging is widely used to prolong the shelf life of food and drink products. With conventional aseptic packaging, the product is filled and sealed in the package under sterile or bacteria-free conditions. Aseptic packaged food and drink products work in conjunction with a dispensing apparatus constrained by the requirements that the system deliver sterile product at the point of use and be cost effective. The shelf-life of aseptically packaged product after opening is re-contamination. The dispensing path of an aseptic package, culminating in a one-way valve, creates an avenue whereby re-contamination can occur and has been the subject of improvement efforts.

One-way valves used in conjunction with aseptic packaging can be classified as those integral to the dispensing apparatus, those comprised of parts integral to the dispensing apparatus and other parts integral to the aseptic packaging, and those integral to the aseptic package. These different one-way valve choices influence the duration of time between opening and product re-contamination, the cost of packaging, and the requirement for product refrigeration.

A dispensing apparatus with an integral one-way valve has the risk of product re-contamination in the connection of the aseptic package to the one-way valve. Absent effective cleaning the life of the product may be considerably lowered due to contamination at the point of connection from the dispensing apparatus to the aseptic package. One effort to address this problem in the prior art is U.S. Pat. No. 6,024,252 where the dispensing apparatus includes integral pinchers to open and close an open-ended, flexible tube connected to the pouch for dispensing product therethrough. The one-way valve closes the tube from the ambient atmosphere by pinching the open end of the tube. In order to dispense product, the pinch valve is released from the tube, and the product is in turn allowed to flow from the pouch and through the open end of the tube. One of the drawbacks of this type of prior art dispenser and packaging is that during installation of the pouch and tube assembly into the dispenser, and during dispensing, there is a risk that bacteria or other unwanted substances can enter into the open ended tube and contaminate the product. If the product is a non-acid product, such as a milk-based product, it must be maintained under refrigeration to ensure the life of the product.

One-way valves integral to an aseptic package address the problem of re-contamination at the connection interface between the aseptic package and the dispensing apparatus through removing the interface, limiting this class of one-way valves to re-contamination solely through the outlet of the one-way valve itself. U.S. Pat. No. 7,322,491 further addresses this problem through advantageous use of a valve-seat, valve-cover combination to hermetically seal the product in the package throughout its shelf life and multiple dispensing of the product. Such a one-way valve allows for the use of non-acid products, such as milk-based products, without refrigeration. Such a one-way valve also creates the need for integration into a dispensing apparatus and the challenges thereby imposed.

Aseptic packaged materials face the problem of contamination upon exit from the package. Sources of contamination include residual material from previous operation of the valve, micro-organism contamination, and contamination introduced to the outlet face of the one-way valve during assembly or cleaning of the dispensing apparatus. A remedy known in the art includes the incorporation of clean-in-place functionality. Clean-in-place functionality institutes periodic cleaning of food contact surfaces by introducing a cleaning fluid like water, soap, bleach, or a like material or combination of materials to the surfaces. The surface then is exposed to an atmospheric change that includes elevated temperature or pressure change. The result of the process is to substantially remove material that would otherwise be positioned to contaminate product subsequently crossing the one-way valve.

Such clean-in-place functionality imposes the constraint that the cleaning fluid not break the hermetic seal between the space being cleaned and the product reservoir. Further, if a one-way valve is used in connection with such clean-in-place functionality, the one-way valve must resist the pressure of fluid used by the clean-in-place functionality so as to prevent the introduction of contaminates into the one-way valve. Additionally, such one-way valves need to maintain their hermetic seal when a temperature gradient is imposed across the one-way valve by the clean-in-place fluid contacting the exterior surface of the one-way valve. Such one-way valves need to not distort or change shape so as to pass a different amount of material in response to a given product pressure as a result of having been subjected to a series of clean-in-place cycles. Finally, such one-way valves need to maintain their hermetic seal when clean-in-place functionality includes the application of a vacuum to the surface of the one-way valve.

Accordingly, it is an object of the present invention to overcome one or more of the above-described drawbacks and/or disadvantages of the prior art.

SUMMARY OF THE INVENTION

In accordance with a first aspect, the present invention is directed to a valve connectable in fluid communication with a fluid-receiving chamber, such as a dilution chamber or a mixing chamber for diluting or mixing a perishable food product, such as a milk product or chocolate product, and forming a substantially fluid-tight seal therebetween. The valve comprises a relatively rigid valve seat, and a relatively flexible valve member or cover overlying the valve seat and forming an axially-elongated, normally-closed valve opening therebetween defining an inlet at one end of the valve seat, an outlet at an opposite end of the valve seat, and an axially-extending seal therebetween that forms a fluid-tight seal between the inlet and outlet of the normally-closed valve opening. An axially-extending valve body is radially spaced relative to the valve member and forms a space therebetween allowing fluid-flow therethrough for cleaning the valve and the fluid-receiving chamber. A seal is engageable with the fluid-receiving chamber and forms a substantially fluid-tight seal therebetween to seal the valve outlet and fluid-receiving chamber with respect to ambient atmosphere. The valve member is movable radially away from the valve seat in response to substance at the inlet to the valve opening exceeding a valve opening pressure to flow into the normally closed valve opening, through the outlet, and into the fluid-receiving chamber.

In some embodiments of the present invention, the valve further comprises a deflector extending axially beyond the outlet of the normally closed valve opening. In some such embodiments, the deflector extends axially beyond a distal end of the valve body. In some such embodiments, the deflector extends axially from the valve seat. In some such embodiments, the deflector defines a distal end, the valve body defines a distal end, and the distal end of the deflector either (1) extends axially about the same extent as the distal end of the valve body, or (2) extends axially beyond the distal end of the valve body. In some embodiments, the deflector is substantially conical shaped.

Preferably, the valve member and the valve seat form an interference fit therebetween. In some such embodiments, the valve member and valve seat define a decreasing level of interference at the inlet relative to the outlet of the normally-closed valve opening. In some such embodiments, the valve member and valve seat define a progressively decreasing level of interference in the direction from the inlet to the outlet of the normally-closed valve opening.

In some embodiments of the present invention, the valve member defines a first thickness at the inlet and a second thickness at the outlet that is less than the first thickness. In some such embodiments, the first thickness is at least about 1¼ times greater than the second thickness, is preferably at least about 1½ times greater, and is more preferably at least about 1¾ times greater.

In some embodiments of the present invention, the valve member defines a distal end, the valve body defines a distal end, and the distal end of the valve member is spaced inwardly relative to the distal end of the valve body. In some such embodiments, the valve body extends annularly about the valve member. In some such embodiments, the valve member extends annularly about the valve seat and includes a base located approximately at the valve opening or upstream of the valve opening. The base extends radially between the valve seat and valve body. In some such embodiments, the base of the valve member defines a curvilinear surface extending substantially radially between the valve seat and valve body. In some such embodiments, the base includes a first curvilinear surface portion adjacent to the valve seat defined by a first radius, and a second curvilinear surface portion adjacent to the valve body defined by a second radius. Preferably, the first radius is greater than the second radius.

In some embodiments of the present invention, the seal extends annularly about a distal end of the valve body. In some such embodiments, the seal is formed integral with the valve member. In some such embodiments, the valve member and seal are co-molded to the valve body, such as by overmolding the valve member and seal to the valve body.

In some embodiments of the present invention, the valve member, seal, and valve body define a space that extends annularly along the valve member and radially between the valve member and valve body for receiving fluid therethrough for cleaning the valve. In some embodiments of the present invention, the chamber is a dilution chamber or a mixing chamber for receiving a perishable food product, the dilution chamber or mixing chamber and valve are subjected to a clean-in-place process involving elevated temperatures above ambient temperature (e.g., up to about 95° C.) and vacuum pressure, and the valve member is made of a material and is configured to define a valve opening pressure that is sufficiently high to maintain a hermetic seal between the valve member and valve seat during the clean-in-place process. In some such embodiments, the valve opening pressure is at least about 5 psi, is preferably at least about 6½ psi, and more preferably is at least about 8½ psi. In some embodiments of the present invention, the valve member is made of silicone.

In some embodiments of the present invention, the valve further comprises a relatively flexible filler extending axially and radially between the valve member and valve body. The valve member defines a first hardness that allows the valve member to flex outwardly relative to the valve seat in response to substance at the inlet exceeding the valve opening pressure. The filler defines a second hardness less than the first hardness for flexing with movement of the valve member, and allowing the valve member to move substantially radially between normally closed and open positions and for substantially preventing debris and like substances from collecting between the valve member and body. In some such embodiments, the first hardness is within the range of about 25 A to about 70 A durometer ("Shore A"), and the second hardness is within the range of about 35 A to about 40 A durometer.

In accordance with another aspect, the present invention is directed to a device including a one-way valve of the present invention and a variable-storage chamber connected in fluid communication with the inlet of the one-way valve. In some such embodiments, the device further includes a flexible tube connected in fluid communication between the valve and variable-volume storage chamber. In some such embodiments, the variable-volume storage chamber is defined by a flexible pouch.

In accordance with another aspect, the present invention is directed to a valve for storing a sterile food product hermetically sealed in a variable-volume storage chamber, and dispensing the sterile food product through the valve and into a dilution chamber or a mixing chamber. The valve is connectable in fluid communication with the dilution chamber or mixing chamber and forms a substantially fluid-tight seal therebetween. The valve comprises first means for forming a relatively rigid valve sealing surface, and second means that is relatively flexible for overlying the first means for forming an axially-elongated, normally closed valve opening therebetween defining an inlet at one end of the first means, an outlet at an opposite end of the first means, and an axially-extending seal therebetween. The second means moves radially away from the first means in response to sterile food product at the inlet exceeding a valve opening pressure to allow the sterile food product to flow into the normally closed valve opening, through the outlet, and into the dilution chamber or mixing chamber. The valve includes third means for enclosing the first and second means that is radially spaced relative to the second means, and extends axially adjacent to the second means for forming a space therebetween and allowing fluid-flow therethrough for cleaning the valve and the dilution chamber or mixing chamber. The valve further includes fourth means engageable with the dilution chamber or the mixing chamber for forming a substantially fluid-tight seal therebetween, and sealing the outlet and the dilution chamber or the mixing chamber with respect to ambient atmosphere. In some embodiments of the present invention, the first means is a valve seat, the second means is a valve member, the third means is a valve body, and the fourth means is a seal.

In accordance with another aspect, the present invention is directed to a method comprising the following steps:

i) providing a one-way valve connected in fluid communication with a variable-volume storage chamber storing therein a liquid that is hermetically sealed with respect to ambient atmosphere;

ii) connecting the one-way valve in fluid communication with a dilution chamber or a mixing chamber, and forming a substantially fluid-tight seal between the one-way valve and the dilution chamber or the mixing chamber;

iii) pressurizing a portion of the liquid from the variable-volume storage chamber to a pressure that exceeds a valve opening pressure of the one-way valve;

iv) introducing the pressurized liquid into an inlet of a normally closed valve opening of the one-way valve;

v) moving with the pressurized liquid a flexible valve member radially away from a relatively rigid valve seat of the one-way valve to open a normally-closed axially extending valve opening of the one-way valve;

vi) allowing the pressurized liquid to flow from the inlet, through the normally-closed axially extending valve opening and, in turn, through an outlet of the normally-closed valve opening and into the dilution chamber or the mixing chamber;

vii) upon passage of the pressurized liquid through the normally-closed valve opening, allowing the resilient flexible valve member to move radially into engagement with the valve seat to seal the normally-closed valve opening; and viii) maintaining the liquid in the variable-volume storage chamber sterile and hermetically sealed with respect to ambient atmosphere throughout the foregoing steps.

In some embodiments of the present invention, the liquid is a perishable food product. In some such embodiments, the perishable food product is a milk product or a chocolate product.

One advantage of the present invention is that it provides a one-way valve for use in a dispensing apparatus whereby liquid can be dispensed from a pouch or other storage chamber without contamination of the product remaining in the pouch. In doing so the one-way valve can provide for a relatively low-cost pouch or other variable-volume storage chamber, for dispensing ready-to-use product, while improving the shelf-life of the product after opening and removing the need for refrigeration after opening.

A further advantage of the currently preferred embodiments of the present invention is that they provide a one-way valve integral to an aseptic pouch or other variable-volume storage chamber where the one-way valve may be easily incorporated into a dispensing apparatus without allowing contamination of the product within the storage chamber. Yet another advantage is that such point-of-use replacements can be made with minimal dispensing apparatus out-of-service time, without the use of tools, if desired, and the one-way valve may be readily inspectable for tampering.

A further advantage of the currently preferred embodiments of the present invention is that the one-way valve can prevent contamination of the remaining product when exposed to an external cleaning or sterilization process. The one-way valve can be exposed to a high temperature fluid such as water during the wash phase of a clean-in-place operation, and debris and/or other material dislodged is prevented from introduction into the one-way valve. Yet another advantage is that the one-way valve maintains its hermetic seal on exposure to a vacuum should negative pressure be employed or otherwise encountered during a clean-in-place operation.

Yet another advantage of the currently preferred embodiments of the present invention is that they allow for dispensing ready-to-drink beverages, or ingredients of beverages, such as milk-based ingredients for coffee drinks or chocolate-based ingredients for coffee and/or milk-based drinks, from one or more hermetically sealed, flexible pouches or other variable-volume storage chambers. Yet another advantage is that the unused portion of a perishable product can be stored hermetically while aseptically preventing contamination and allowing for hermetically-sealed storage after dispensing without refrigeration.

Other objects and advantages of the present invention, and/or of the currently preferred embodiments thereof, will become more readily apparent in view of the following detailed description of the currently preferred embodiments and accompanying drawings.

DETAILED DESCRIPTION OF EMBODIMENTS OF THE INVENTION

Figure 1:
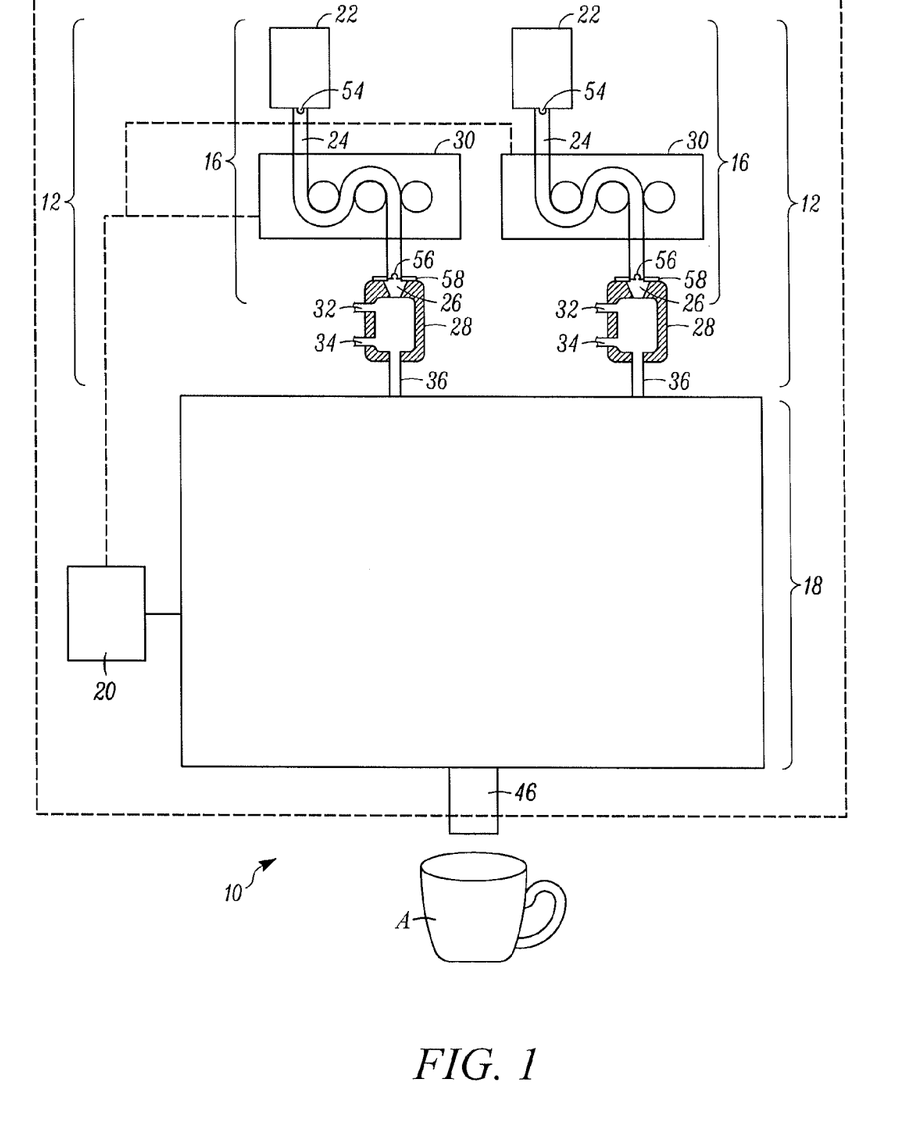
FIG. 1 is a somewhat schematic view of a dispensing apparatus employing multiple one-way valve, tube and pouch assemblies, and including pumps, dilution chambers or mixing bowls, and passageways so as to allow for the further selective mixing of fluid passed across the one-way valves.

In FIG. 1 a dispensing apparatus embodying the present invention is indicated generally by the reference numeral 10. The dispensing apparatus 10 is contained within the dashed line of FIG. 1 and includes the elements described below so as to effect the preparation and dispensing of ready-to-serve beverages into serving containers "A". The dispensing apparatus 10 includes two primary sections 12 configured in a parallel relationship with respect to each other for supplying respective ingredients, such as milk concentrate and chocolate concentrate, diluting and/or mixing the respective ingredients with hot water or other liquid(s), if desired, and, in turn, supplying the diluted/mixed ingredients to a secondary section 18 for final preparation and dispensing into serving containers A. Each primary section 12 includes a reservoir assembly 16 containing a first aseptically stored substance. In a preferred embodiment, one reservoir assembly 16 contains an aseptically stored substance differing from that contained in the other reservoir assembly 16. As may be recognized by those of ordinary skill in the pertinent art based on the teachings herein, the dispensing apparatus may include only one primary section 16, may include more than two primary sections 16, and may include more than one secondary section 18 each coupled in fluid communication with one or more respective primary section(s) 16.

The two reservoir assemblies 16, 16 hermetically seal with respect to the ambient atmosphere first and second substances, respectively, until such time as one, the other, or both are triggered for release. The substances contained within each reservoir assembly 16 may take the form of any of numerous different products that are currently known, or that later become known, including without limitation any of numerous different food and beverage products, such as milk based products, including milk, evaporated milk, condensed milk, cream, half-and-half, baby formula, yogurt, soup (whether milk-based or not), and any of numerous other liquid nutrition products, ice cream (including dairy and non-dairy, such as soy-based ice cream), juice, syrup, chocolate, chocolate concentrate, coffee, condiments, such as ketchup, mustard, and mayonnaise, and gases, such as coffee aroma. An exemplary embodiment hermetically seals milk concentrate in one reservoir assembly 16 and chocolate concentrate in the other reservoir assembly 16 which pass through the respective primary sections 12, 12, are diluted by and mixed with hot water, are further passed to and mixed together in the secondary section 18, and finally deposited into a serving container A as a ready-to-drink beverage accessible to the user.

A computerized controller 20 is electrically connected to the primary sections 12 and secondary section 18, including the pumps and other electrically actuated or other electrical components of such sections and the dispensing apparatus 10, in order to control actuation of such components in a manner known to those of ordinary skill in the pertinent art. For example, triggering of the release of one, the other, or both substances and the their subsequent manipulation with the dispensing apparatus so as to be combined as a ready-to-drink beverage in the serving container A is effected through interaction of the user with the controller 20. The user, by selecting a specific, desired ready-to-drink beverage causes the controller 20 to operate the elements further described in such order and fashion as to effect the delivery of the ready-to-drink beverage into the serving container A. The controller 20 also triggers the functionality required to clean the subsequently described elements in place so as to substantially remove debris, contamination, and residue so as to provide a safe, sterile, and desirable ready-to drink beverage into the serving container A.

As further shown in FIG. 1, each reservoir assembly 16 includes a variable-volume storage chamber 22, a flexible tube 24, and a one-way valve 26 through which the reservoir is releasably engaged to the dispensing apparatus 10. Each variable-volume storage container 22 is releasably engaged to the dispensing apparatus 10 by structure known to those of ordinary skill in the pertinent art adapted to support, fix, and allow for ease of installation and removal of the assembly. For example, in one such embodiment (as shown in broken lines in FIG. 2), each variable-volume storage chamber is a flexible pouch contained within a cardboard or like box. Each one-way valve 26 is releasably engaged to the dispensing apparatus 10 through connection to a respective primary dilution chamber or mixing bowl 28 through means subsequently described, whereby the volume of the dilution chamber or mixing bowl 28 is hermetically sealed from its outside environment and allows for ease of installation and removal by an apparatus operator. A flexible tube 24 included with each first reservoir assembly 16 is releasably engaged to the dispensing apparatus 10 by a respective peristaltic pump 30 which employs rollers to selectively squeeze the flexible tube 24 for purposes of moving a desired portion of the substance contained within the respective reservoir assembly 16 across the one-way valve 26. In manner likewise to the one-way valve 26 and the variable-volume storage container 22, the engagement of the flexible tube 24 provides accessibility whereby installation and removal by an operator is effected quickly, safely, and without the requirement of tools, if desired.

Each primary section 12 further includes elements for mixing portions of product and delivering them to the secondary section 18. Each primary section 12 further includes a primary dilution chamber or mixing bowl 28 shown in cross-section in FIG. 1 to illustrate a valve connector 58 adapted to releasably engage the one-way valve 26 and, in turn, releasably connect the valve to the dilution/mixing bowl 28 and form a hermetic or substantially fluid-tight seal therebetween. Each primary dilution chamber or mixing bowl 28 further defines a first port 32 and a second port 34, both substantially adapted to allow for engagement to either or a combination of a vacuum source (not shown), a water source (not shown), or a clean-in-place wash down means (also not shown). As may be recognized by those of ordinary skill in the pertinent art based on the teachings herein, each dilution/mixing chamber 28 can include only one port 32 or 34, or can include more than two such ports, as may be desired or otherwise required. Each dilution chamber or mixing bowl 28 is adapted to so engage a respective interconnect line 36 as to permit the selective fluid communications between the respective primary dilution chamber or mixing bowl 28 and the secondary section 18.

The secondary section 18 of the dispensing apparatus 10 delivers the substances from one or both primary dilution/mixing chambers through an outlet 46 to a serving container A or other container or device. For example, the secondary section 18 may deliver substances from one or both primary dilution/mixing chambers 28 to a container A, or may combine the substances from one or more primary dilution/mixing chambers or one or more secondary dilution/mixing chambers (not shown), and in turn deliver the mixed substances to one or more containers A. As may be recognized by those of ordinary skill in the pertinent art based on the teachings herein, the secondary section 18 of the dispensing apparatus 10 may take the form of any of numerous different devices or configurations for receiving and further combining or mixing substances and, in turn, delivering such mixed substances to a serving or other container or device, and/or for delivering the substances from one or more primary sections directly to a respective serving or other container or device, that is currently known, or that later becomes known.

As may be recognized by those of ordinary skill in the pertinent art based on the teachings herein, the reservoir assemblies 16, 16 may include elements of different size, geometries and be constructed of different material and design to accommodate different stored substances or other requirements. Exemplary embodiments include variable-volume storage containers 22 sized differently due to the different ratios of sealed content required for the ready-to-drink beverages the dispensing apparatus 10 provides. One peristaltic pump 30 in another exemplary embodiment is sized differently than the other peristaltic pump 30, engages with a flexible tube 24 of a different stiffness, and/or works in conjunction with a one-way valve 26 constructed of different materials to account for differing viscosities between the substances hermetically sealed in the respective reservoir assemblies. Further, while these exemplary embodiments demonstrate the ability of the dispensing apparatus 10 to accommodate a variety of substances, they do not exclude the configuration where the reservoir assemblies 16, 16 are substantially identical. Still further, the specific types of variable-volume storage chambers, pumps and other components described herein are only exemplary, and any of numerous other types of storage chambers, pumps and other components that are currently known, or that later become known, equally may be employed.

FIG. 1 further illustrates an operating mode of the apparatus 10 through the configurable setup of each primary dilution chamber or mixing bowl 28. The illustrated embodiment of each primary dilution chamber or mixing bowl 28 includes the first port 32 and optional second port 34 whereby, in a preferred embodiment, a substance like heated water is introduced to dilute the substance that has moved across the one-way valve 26 which is then passed to the secondary section 18 for further mixing and delivery and/or direct delivery to the container or device A. In an alternative embodiment, a substance such as coffee or tea concentrate moves across a first port 32 and is combined with a substance introduced into the respective primary mixing bowl 28 through the second port 34. The concentrate and water, once combined in the respective primary dilution chamber or mixing bowl 28 (which is distinguishable due to entry without the passage of an aseptically stored substance across the respective one-way valve 26), then pass to the secondary section 18 and out as a ready-to-drink beverage through the outlet 46.

These exemplary embodiments serve to illustrate the flexibility of the dispensing apparatus with regard to the preparation of ready-to drink beverages that would be apparent to one skilled in the art. Beverages can be prepared from neither of, one of, or both of the substances contained in each reservoir assembly 16, 16 (or additional reservoir assemblies if so employed, as indicated above). Further, beverages can be prepared from substances which due to a property such as acidity do not require a hermetically sealed reservoir to store the unused portions. Finally, ready-to-drink beverages can be prepared using the subject invention where a subset of the required substances require hermetic, aseptic storage and a subset which do not.

The inclusion of additional primary section(s) 12 provides for additional operating modes to that described above. For example, in another mode the apparatus 10 operates so as to receive in the secondary section 18 the contents of a second primary dilution/mixing bowl 28, further mix, and discharge the contents through the outlet 46. In a further operating mode, the secondary section 18 receives contents from both a first primary dilution/mixing bowl 28 and a second primary dilution/mixing bowl 28, mixes the substances, and discharges the combination, through the outlet 46. Finally, in another operating mode, the contents of the secondary section 18 received from any one of the aforementioned operating modes are further combined with a substance received into the secondary section 18 prior to discharge as a ready-to-drink beverage through the outlet 46. If desired, the secondary section 18 may define plural outlets 46, wherein each outlet is coupled in fluid communication directly or indirectly with respective primary sections 12 or plural primary sections 12. These additional operating modes illustrate a subset of the operating means provided by the dispensing apparatus 10 whereby ready-to-drink beverages are prepared from individual or multiple liquids stored in the plural reservoir assemblies 16, 16. As would be recognized by those of ordinary skill in the pertinent art based on the teachings herein, the described operating modes may be employed in any of numerous other ways to create ready-to-serve beverages that are currently known or that later become known.

Figure 2:
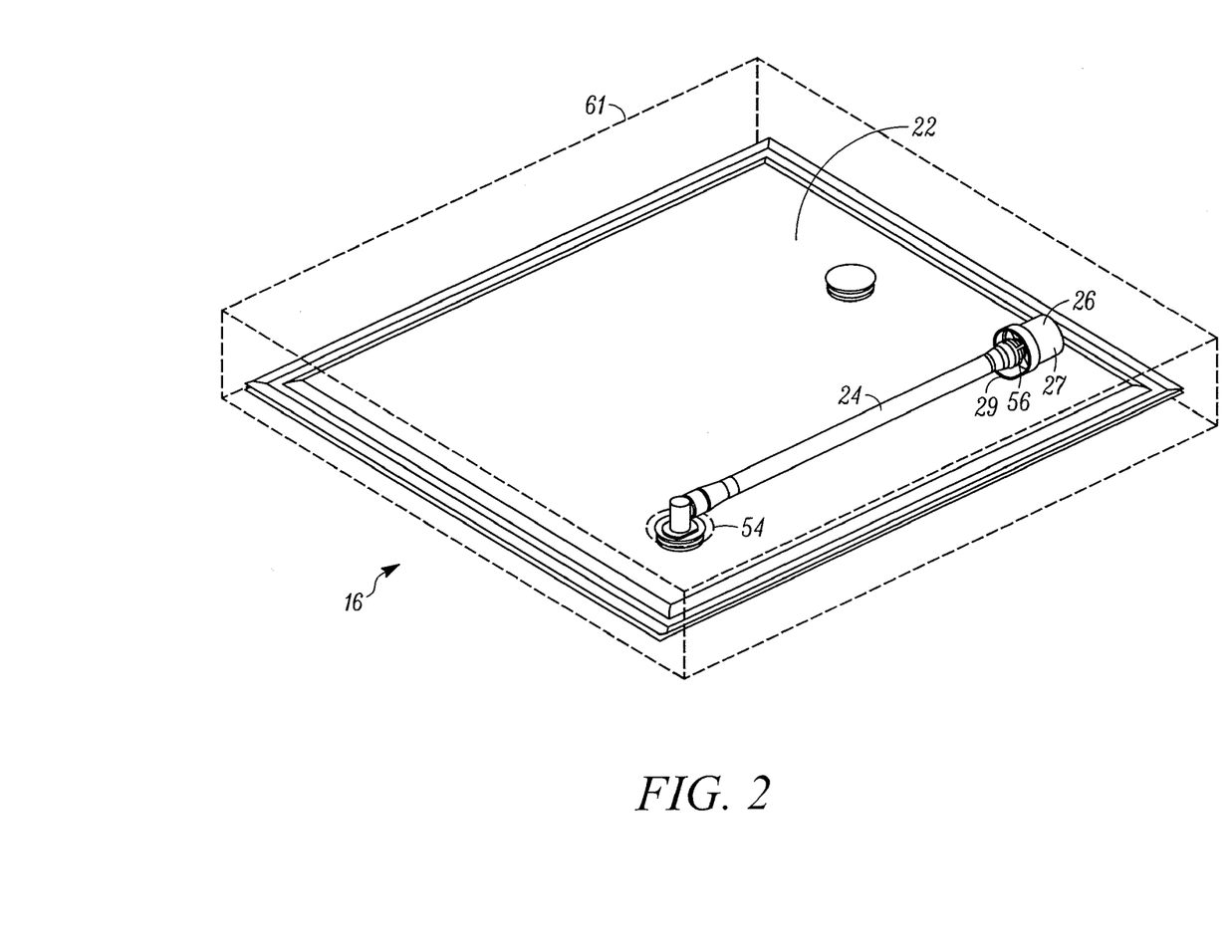
FIG. 2 is a perspective view of one of the flexible pouch, tube and valve assemblies of the dispensing apparatus of FIG. 1.

With reference to FIG. 2, each reservoir assembly 16, which is releasably mountable within the dispensing apparatus 10, includes the variable-volume storage chamber 22 for the aseptic storage of the unused portions subsequent to the installation of the reservoir into the dispensing apparatus. Each reservoir assembly 16 further includes the flexible tube 24 and the one-way valve 26 where the flexible tube 24 couples the one-way valve 26 in fluid communication with the variable-volume storage chamber 22. The variable-volume storage chamber 22 is hermetically affixed to the flexible tube 24 through a reservoir fitting 54. The one-way valve 26 is further hermetically affixed to the flexible tube 24 by means of a one-way valve fitting 56. Alternatively, the flexible tube 24 may be heat sealed, welded, adhesively attached, or otherwise permanently connected to the variable-volume storage chamber 22, or material forming the reservoir, such as a plastic or laminated pouch, in any of numerous different ways that are currently known, or that later become known, to hermetically seal the flexible tube 24 to the one-way valve 26 and variable-volume storage chamber 22. Similarly, the one-way valve 26 may be connected to the flexible tube 24 in any of numerous different ways that are currently known, or that later become known. In the illustrated embodiment, the variable-volume storage chamber 22 is defined by a flexible pouch of a type known to those of ordinary skill in the pertinent art, and is aseptically filled with the respective perishable food product or other substance in a manner known to those of ordinary skill in the pertinent art.

As also shown in FIG. 2, during shipping and handling, the one-way valve 26 may include a protective cover 27 that encloses the valve, and is frangibly connected thereto by a frangible ring connector 29. Prior to releasably connecting the one-way valve 26 to the respective dilution/mixing chamber 28, the operator manually grips and breaks the frangible ring connector 29 which, in turn, allows removal of the protective cover 27. One advantage of the protective cover 27 is that it protects the one-way valve 26 during shipping and handling, and prevents anyone from tampering with the one-way valve prior to installation in the dispensing apparatus.

As indicated in broken lines in FIG. 2, the flexible pouch 22 is contained within a rigid pouch support structure 61, such as a cardboard box or like enclosure of a type known to those of ordinary skill in the pertinent art, to facilitate handling, shipping, and installation into and removal from the dispensing apparatus 10. The support structure 61 in the exemplary embodiment of FIG. 2 imposes a substantially cubical shape to the flexible pouch so as to protect the pouch during shipment, storage, installation, and use. The support structure 61 further aids in quick, economical, and safe installation of each reservoir assembly 16, 16 into the dispensing apparatus 10. As would be recognized by those of ordinary skill in the pertinent art based on the teachings herein, the shape of each variable-volume storage chamber 22 can be adapted through the selection of a rigid support structure so as to meet the needs of the dispensing apparatus 10; for example, by having an inverted taper so as to present at its bottom a cross-section similar to that of flexible tube 24 to facilitate the movement of material out of the variable-volume storage container. Further, the shapes of each variable-volume storage chamber 22 may comparatively vary in volume in accordance with disparate usage requirements as when used to create a ready-to-drink hot chocolate drink where a greater portion of a first milk concentrate is combined with a smaller portion of a second chocolate concentrate, or vice versa.

Figure 3:
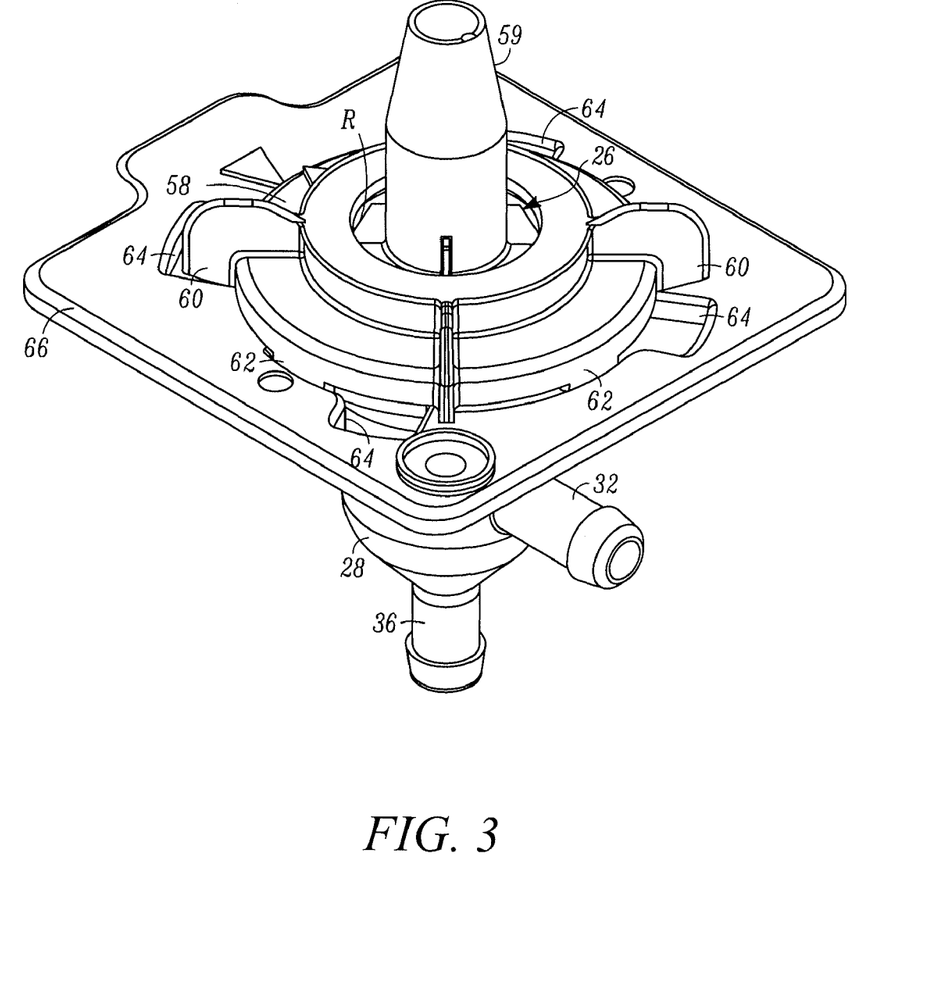
FIG. 3 is a perspective view of one of the dilution chambers or mixing bowls and a one-way valve releasably connected thereto of the dispensing apparatus of FIG. 1.

FIG. 3 illustrates in further detail an exemplary connector 58 for releasably connecting the one-way valve to the respective dilution/mixing chamber 28 and, in turn, facilitating the formation of and/or maintaining a fluid-tight seal between the connected valve and the dilution/mixing chamber. As may be recognized by those of ordinary skill in the pertinent art based on the teachings herein, each connector 58 may take the form of any of numerous different connectors that are currently known, or that later become known. For example, the connectors may form a snap fit or a threaded connection between the valves and dilution/mixing chambers. Alternatively, the connectors may employ fasteners, such as thumb screws or bail screws, or other fasteners that are currently known, or that later become known, for releasably connecting the valves to the dilution/mixing chambers. As hereinafter described, each valve includes a seal between the valve and the dilution/mixing chamber to form a fluid-tight or hermetic seal therebetween. If desired, the connectors may facilitate in compressing the seals when releasably connecting the valves to, in turn, form and/or maintain the fluid-tight or hermetic seals between the releasably connected valves and dilution/mixing chambers.

In the illustrated embodiment, each exemplary connector 58 is a ring connector that surrounds the inlet tube 59 of the one-way valve. Although not shown in FIG. 3, the outlet end of the flexible tube 24 is connected to the inlet tube 59 to introduce substance from the variable-volume storage chamber 22 and flexible tube 24 into the valve. The connector 58 surrounds the flexible tube 24 in such a way that it both translates axially along the flexible tube 24 and rotates about the axis of the flexible tube 24 and inlet tube 59. The connector 58 is further permanently included in the reservoir assembly insofar as the depicted embodiment includes a connector 58 where the inside radius "R" of the connector is greater than that of the flexible tube 24 but smaller than the outer diameter of the one-way valve 26 (i.e., the connector 58 is captured on the flexible tube 24 between the one-way valve 26 and pouch connector 54 (FIG. 2)).

Figure 4:
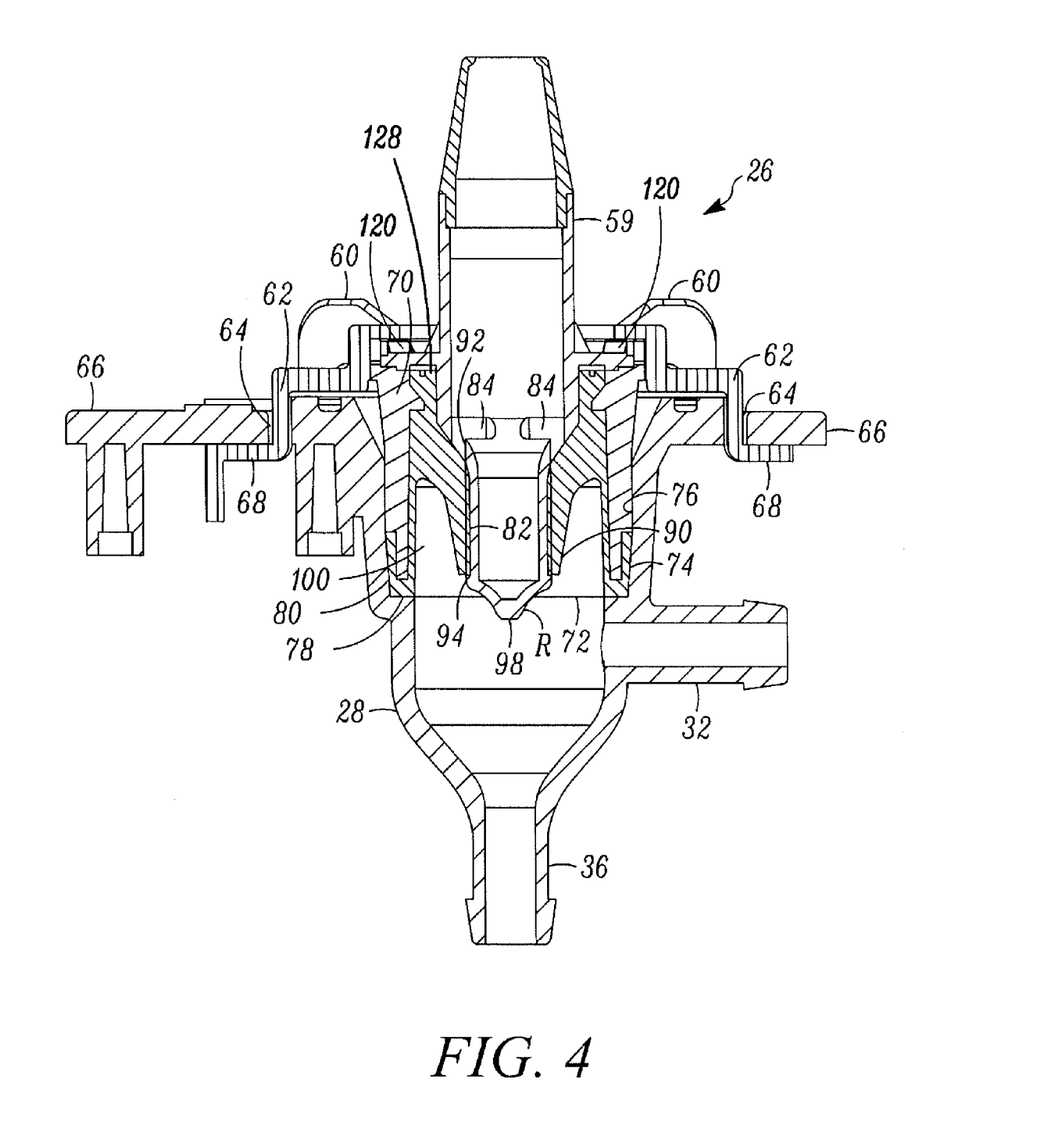
FIG. 4 is a cross-sectional view of the dilution chamber/mixing bowl and one-way valve of FIG. 3.

As shown best in FIG. 3, each exemplary connector 58 includes a plurality of installation ears 60 that are angularly spaced relative to each other about the axis of one-way valve 26. As shown in FIGS. 3 and 4, each exemplary connector 58 further includes a plurality of depending connection tabs 62 that are angularly spaced relative to each other about the circumference of the connector, and are received within corresponding angularly-extending slots 64 formed through a laterally-extending upper wall 66 of the dilution/mixing chamber 28 to releasably connect the one-way valve to the dilution/mixing chamber. As shown in FIG. 4, each depending tab 62 defines a laterally extending leg 68 that frictionally engages the underside of the upper wall 66 to releasably hold the connector and one-way valve in place.

Figure 5:
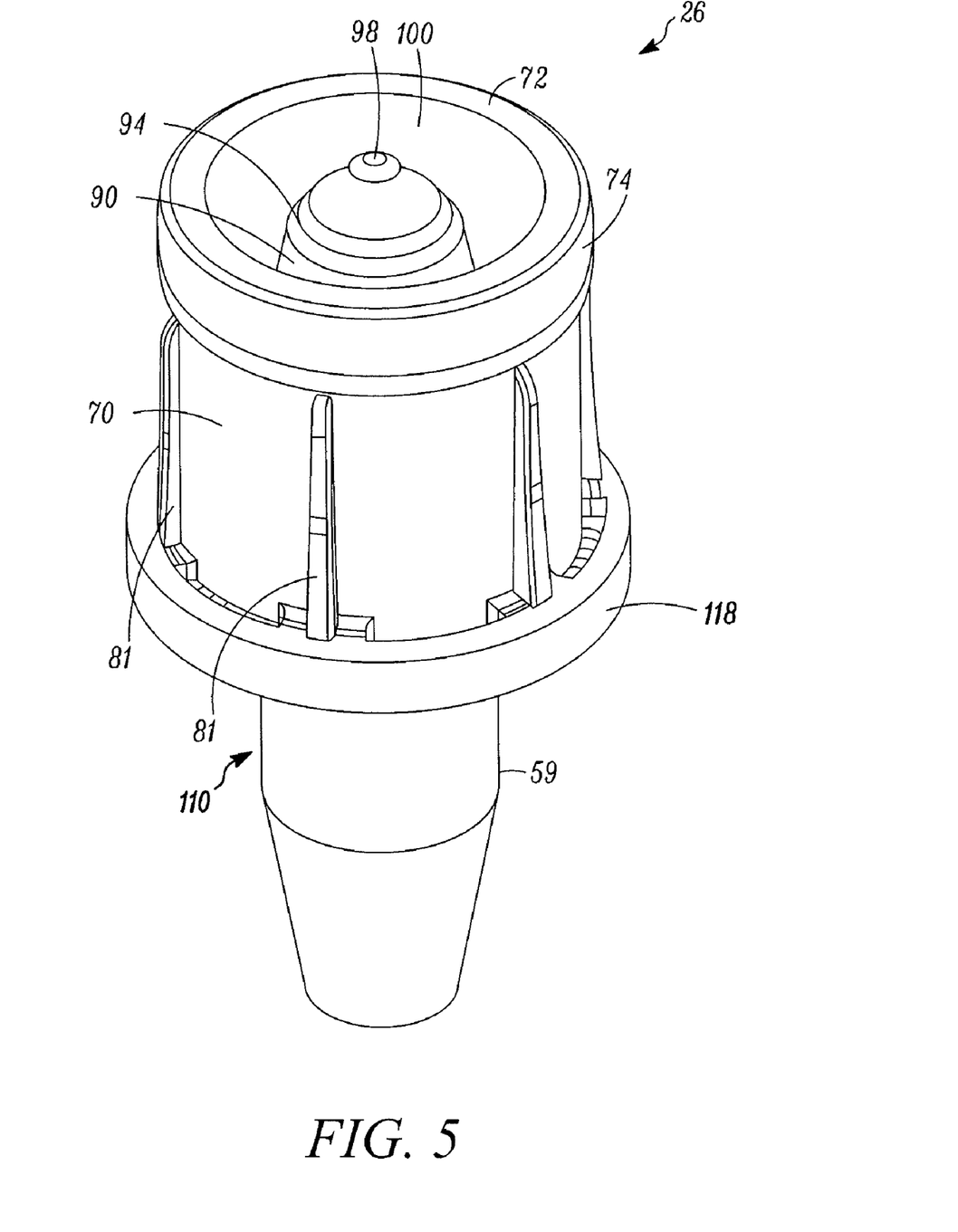
FIG. 5 is a perspective view of the one-way valve of FIGS. 3 and 4 without the flexible tube and pouch connected thereto.
Figure 6:
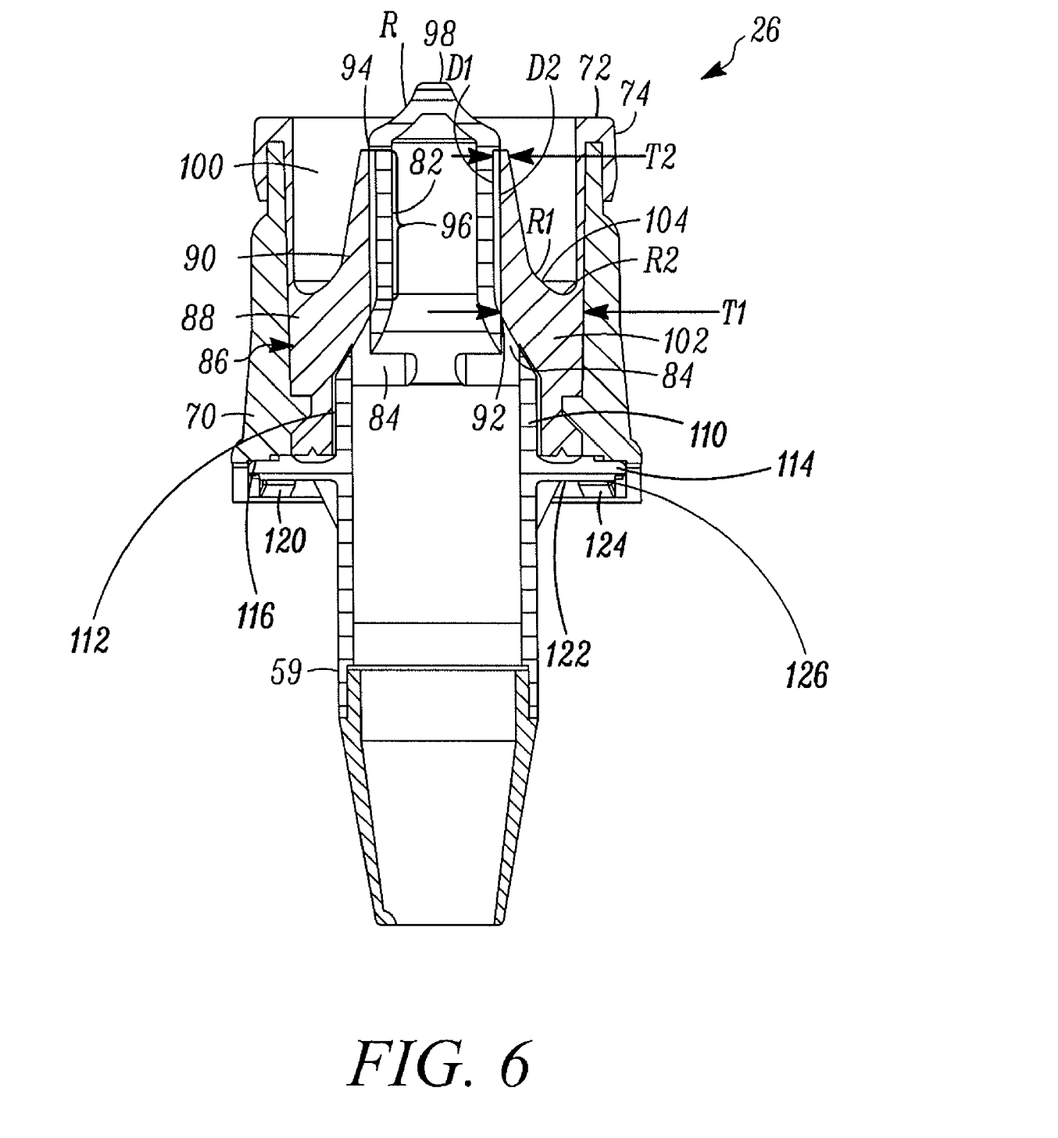
FIG. 6 is a cross-sectional view of the one-way valve of FIG. 5.

As shown best in FIGS. 4 through 6, each one-way valve 26 includes an annular valve body 70 and an elastomeric seal including a first or distal seal 72 formed at the distal end of the valve body, and second or lateral seal 74 formed on the outer periphery of the distal end of the valve body. As shown in FIG. 4, the dilution/mixing chamber 28 includes a valve port 76 in fluid communication with the internal dilution/mixing chamber for receiving therein the one-way valve 26, and defines at the base thereof a first sealing surface 78 oriented substantially normal to the axis of the valve and dilution/mixing chamber, and a second sealing surface 80 defined by the side wall of the valve port 76 contiguous to the first sealing surface 78. As can be seen, when the one-way valve 26 is inserted into the valve port 76 of the dilution/mixing chamber 28, the first seal 72 sealingly engages the first sealing surface 78, and the second seal 74 sealingly engages the second sealing surface 80, to thereby form a substantially fluid tight seal between the one-way valve and dilution/mixing chamber and hermetically seal the chamber from the ambient atmosphere.

In order to releasably connect the one-way valve 26 to the dilution/mixing chamber 28, the operator removes the frangible cover 27 (FIG. 2) and inserts the valve body 70 into the valve port 76 until the first seal 72 abuttingly engages the first sealing surface 78, and the second seal 74 abuttingly engages the second sealing surface 80. Then, the operator inserts the depending tabs 62 of the ring connector 58 into the corresponding slots 64 of the dilution/mixing chamber 28, manually engages two of the diametrically opposed ears 60, and rotates the connector 58 so that the laterally extending legs 68 frictionally engage the underside of the upper wall 66 of the dilution/mixing chamber. In order to rotate the connector, the user may simultaneously press downwardly on the connector and/or one-way valve to compress the first and/or second seals 72 and 74, respectively. The compression of the seal(s) 72, 74 facilitates in maintaining a fluid-tight seal between the one-way valve 26 and dilution/mixing chamber 28, and contributes to frictionally engaging the laterally-extending legs 68 with the underside of the upper wall 66 to releasably hold the connector and one-way valve in place. As indicated above, any of numerous different connectors that are currently known, or that later become known, equally may be employed to releasably connect the valves to the dilution/mixing chambers. The connectors may, if desired, operate to compress the seals to further effect and/or maintain a substantially fluid-tight seal between the respective valve and dilution/mixing chamber. As shown in FIG. 5, the external periphery of the valve body 70 includes a plurality of axially-extending alignment ribs 81 that are angularly spaced relative to each. The alignment ribs 81 serve to axially align the one-way valve 26 to the dilution/mixing bowl 28 and affix the one-way valve 26 rotationally with respect to the axis of the dilution/mixing chamber.

As shown in FIG. 4, each one-way valve 26 includes the valve body 70 that extends annularly about the one-way valve, the inlet tube 59 that is connected to the flexible tube 24 (FIG. 2) and defines an axially-extending passageway, an axially-extending, relatively rigid valve seat 82, and a plurality of flow apertures 84 on a substantially fixed radius from the axis of the valve seat 82 extending axially through the valve body 70 adjacent to the valve seat 82 and coupled in fluid communication with the axially-extending passageway of the inlet tube 59. An exemplary embodiment of the one-way valve 26 includes three flow inlet apertures 84 spaced about 120° apart about a common radius from the axis of the valve seat 82. However, as may be recognized by those of ordinary skill in the pertinent art based on the teachings herein, each one-way valve may define any of numerous different numbers of apertures and/or aperture configurations that are currently known or that later become known.

The one-way valve assembly 26 further includes an annular valve member or cover 86 formed of an elastic material, such as silicone, and including a cover base 88 mounted on the valve body 70 and fixedly secured against axial movement relative thereto. The valve member 86 further defines a valve portion 90 overlying the valve seat 82, and as indicated by the overlapping lines in FIG. 6, defining an interference fit therebetween. The valve portion 90 defines an inner diameter D1 less than the outer diameter D2 of the valve seat 82 to thereby form the interference fit therebetween (as indicated by the overlapping lines in FIG. 6). The flexible overlying valve portion 90 and underlying rigid valve seat 82 form an axially-elongated, normally-closed valve opening therebetween defining an inlet 92 at one end of the valve seat 82, an outlet 94 at an opposite end of the valve seat 82, and an axially-extending seal 96 therebetween that forms a fluid-tight seal between the inlet and outlet of the normally-closed valve opening. The valve portion 90 is movable radially away from the valve seat 82 in response to substance at the inlet apertures 84 and inlet 92 exceeding a valve opening pressure to flow into the normally closed valve opening 96, through the outlet 94, and into the respective dilution/mixing chamber 28.

As may be recognized by those of ordinary skill in the pertinent art based on the teachings herein, the valve member and valve seat may define any of numerous different configurations that are currently known, or that later become known. For example, the valve portion 90 and valve seat 82 may define a decreasing level of interference at the inlet 92 relative to the outlet 94 of the normally-closed valve opening 96. Further, the valve portion 90 and valve seat 82 may define a progressively decreasing level of interference in the direction from the inlet 92 to the outlet 94 of the normally-closed valve opening 96. Still further, the valve portion need not be annular as shown, but rather may define an arc shape, such as a semi-circular shaped valve seat. Further, the valve portion and valve seat may define a progressively increasing level of interference when moving angularly from the center of an arc-shaped valve portion and valve seat laterally (or angularly) outwardly from the center toward the lateral or marginal edge portions of the valve portion/valve seat interface.

In the illustrated embodiment, the valve member 86 is made of a material, such as silicone, and is configured to define a valve opening pressure that is sufficiently high to maintain a hermetic seal between the valve member and valve seat during a clean-in-place process. The valve opening pressure is at least about 5 psi, is preferably at least about 6½ psi, and more preferably is at least about 8½ psi. The valve member also defines a first thickness T1 at the base of the valve portion and/or at about the inlet 92, and a second thickness T2 at about the outlet 94 that is less than the first thickness T1. The first thickness T1 is at least about 1¼ times greater than the second thickness T2, is preferably at least about 1½ times greater, and is more preferably at least about 1¾ times greater. One advantage of this configuration is that the increased thickness at the base can be selected to set the valve opening pressure at a level that prevents the valve from opening when subjected to a vacuum within the respective dilution/mixing chamber 28, such as during a clean in place cycle.

The one-way valve 26 further comprises a deflector 98 extending axially beyond the outlet 94 of the normally closed valve opening 96. The distal end of the deflector 98 either (1) extends axially about the same extent as the distal end of the valve body 70, or (2) extends axially beyond the distal end of the valve body 70. In the illustrated embodiment, the deflector 98 extends axially from the valve seat 82 beyond the distal end of the valve body defined by the first seal 72. Also in the illustrated embodiment, the deflector 98 is substantially conical shaped and, as shown in FIG. 6, the side wall of the cone is curved inwardly and defined by a radius "R". The deflector 98 protects the valve portion 90 and substantially prevents contact with the outlet 94 of the valve. The recessed cone defined by one or more radii R facilitates in deflecting fluid that impacts the deflector, such as a cleaning fluid, from directly impacting the valve outlet 94, and in directed such fluid into the annular space formed between the valve member and valve body as hereinafter described.

As seen in the Figures, in the illustrated embodiment the valve 26 is comprised of multiple parts, here two. The valve body 70, which includes the valve cover 86, is formed as one part, and a valve core 110 is formed as another part. The valve core 110 includes the inlet tube 59, valve seat 82 and deflector 98, which in the illustrated embodiment are integral with each other, and defines the flow apertures 84. As illustrated, the valve body 70 and valve core 110 are snap fit together. The valve core 110 is inserted into the annular space 112 defined by the annular valve member 86 until a valve core flange 114 of the valve core 110 seats against a rear flange 116 of the valve body 70. The valve core flange 114 is positioned relative to the valve seat 82, and the rear flange 116 is positioned relative to the valve portion 90, so that when the valve core 110 seats into the valve body 70, the valve seat 82 engages the valve portion to form the valve opening and seal 96.

To maintain the valve core flange 114 in place in the valve body 70, the valve body 70 has an engagement portion 118, in the illustrated embodiment located at the rear end of the valve body 70, that contains a plurality of inwardly extending snap tabs 120. The snap tabs 120 locate a rear surface 122 of the valve core flange 114 when the valve core 110 is seated in the valve body 70. Similar to known snap fit arrangements, and as seen in the Figures, the forward surfaces 124 of the snap tabs 120 that locate the rear surface 122 of the valve core flange 114 are oriented substantially parallel to the rear surface 122, and the rearward surfaces 126 of the snap tabs 120 are angled relative to the valve core flange 114. In addition, the engagement portion 118 is sufficiently resilient so that when the valve core flange 114 engages the rearward surfaces 126 during snap fit insertion of the valve core 110 into the valve body 70, the snap tabs 120 flex sufficiently outward to permit the valve core flange 114 to pass beyond the snap tabs 120 seat into the valve body 70. Once the valve core flange 114 passes by the snap tabs 120, the snap taps 120 return towards an inward position so that the forward surfaces 124 overlap the rear surface 122 and normally prevent the valve core 110 from removal from the valve body 70.

As further seen in the illustrated embodiment, the valve cover 86 defines an annular rear sealing surface 128 that sealingly engages the valve core flange 114 when the valve core flange 114 is seated in the valve body 70. The rear sealing surface 128 thus defines a liquid-tight seal between the valve body 70 and the valve core 110.

As shown in FIG. 6, the axially-extending valve body is radially spaced relative to the valve portion 90 and forms a radially and axially extending space 100 therebetween allowing fluid-flow therethrough for cleaning the valve 26 and the dilution/mixing chamber 28. The deflector 98 facilitates in directing any water or other fluid contacting it into an annular space 100 to facilitate cleaning the valve. As shown typically in FIG. 6, in order to protect the outlet 94 of the valve, the distal end of the valve portion 90 is spaced inwardly relative to the distal end of the valve body 70 to thereby allow the valve body to substantially enclose and protect the valve. As also shown typically in FIG. 6, the valve member defines a base 102 located approximately at the flow apertures 84, and in the illustrated embodiment, the base 102 extends upstream relative to the flow apertures. As can be seen, the base 102 extends radially between the valve seat 82 and annular valve body 70, and defines a curvilinear surface 104 extending substantially radially between the valve seat 82 and valve body 70. The curvilinear surface 104 includes a first curvilinear surface portion adjacent to the valve seat 82 defined by a first radius R1, and a second curvilinear surface portion adjacent to the valve body 70 defined by a second radius R2. As can be seen, the first radius R1 is greater than the second radius R2. One advantage of the curvilinear contour at the base of the valve member is that it facilitates the flow of fluid, such as cleaning fluid, through the annular space 100 and substantially prevents the collection of any residue or debris within this space. As also shown in FIG. 6, the first and second seals 72 and 74, respectively, are formed integral with the valve portion 90 by co-molding the valve member and seals. In the illustrated embodiment, the valve portion 90 and seals 72, 74 are overmolded to the valve body 70.

In an exemplary operation of the dispensing apparatus 10, a user dispenses a substantially predetermined amount of fluid from the variable-volume storage chamber 22 through the one-way valve 26 into the first primary dilution/mixing bowl 28. The content of the first primary mixing bowl 28 is then combined with a second, different fluid which enters through the port 32. The combined fluid contents of the first primary dilution/mixing bowl 28 is then conveyed through the interconnect tube 36 to the secondary section 18. Concurrently or in a sequence appropriate to the fluid, the controller 20 then dispenses a substantially predetermined amount of fluid from the variable-volume storage chamber 22 into the second primary dilution/mixing bowl 28. The content of the secondary section 18 is then conveyed through the interconnect tube 36 to the secondary section 18. There the fluids are then mixed, and conveyed through the outlet 46 for consumption as a ready-to-serve beverage.

As may be recognized by those of ordinary skill in the pertinent art based on the teachings herein, the dispensing apparatus 10 is particularly suitable for storing and dispensing ready-to-drink products, such as those that are generally difficult to preserve upon opening. Accordingly, a significant advantage is that such products can be distributed and stored at an ambient temperature while allowing the product to remain shelf-stable even after dispensing product from the pouch, whether refrigerated or not. Further, the present invention has the advantage of combining the product with other products or diluting it based on the requirements of the user. Finally, the present invention has the added advantage of allowing for clean-in-place of the product facing surfaces of the one-way valves so as to substantially prevent the accumulation of debris or growth of micro-organisms thereon.

Figure 7:
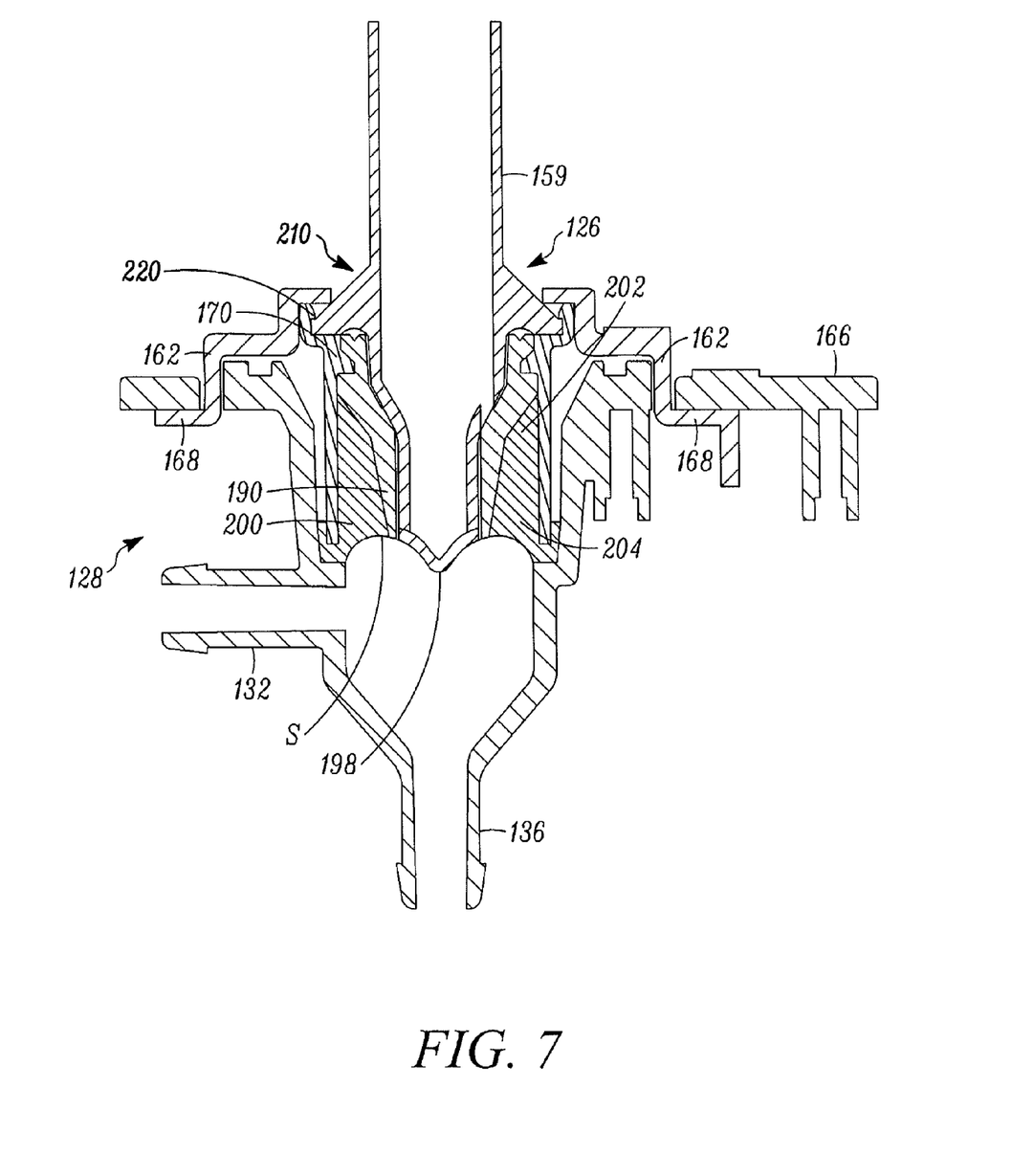
FIG. 7 is a cross-sectional view of another embodiment of a one-way valve releasably connected to a dilution chamber/mixing bowl of the dispensing apparatus of FIG. 1

Turning to FIG. 7, another one-way valve embodying the present invention is indicated generally by the reference numeral 126. The one-way valve 126 is substantially the same as the valve 26 described above, and therefore like reference numerals preceded by the numeral "1" are used to indicate like elements. The primary difference of the one-way valve 126 is that it includes a filler 200 located in the annular region between the valve portion 190 and valve body 170, that is formed of an elastic material of lesser hardness than that of the valve portion. The filler 200 defines an inner filler end 202, and a distal filler end 204, where the filler material constitutes the contact face of the one-way valve 126. As can be seen, filler 200 is contoured at the distal filler end 204 so as to present to an inverted, cupped surface S that is easily cleaned. The cupped cavity surface S defines a gently curved surface which is amenable to cleaning by fluid introduced into the respective dilution/mixing bowl 128 for that specific purpose with sufficient volume and force so as to remove debris, contaminates and micro-organisms thereby producing a sanitary surface.

As may be recognized by those of ordinary skill in the pertinent art based on the teachings herein, numerous changes, modification and improvements may be made to the above-described and other embodiments of the present invention without departing from its scope as defined in the appended claims. For example, the one-way valve may be made of any of numerous different materials, and may take any of numerous different configurations. For example, the valve cover may extend annularly about the valve seat, or may define a non-annular, arcuate shape that forms an interference fit with a correspondingly shaped valve seat. The one-way valve may define any desired number of inlet apertures, normally-closed valve opening seal lengths, and may or may not include any of numerous different deflectors. Similarly, the one-way valve may be connected and sealed to a fluid-receiving chamber, such as a dilution chamber and/or mixing bowl, in any of numerous different ways that are currently known, or that later become known. For example, the one-way valve need not include separate connectors, such as the exemplary ring connectors, but rather the valve itself may form a connector or fastener for releasably connecting the valve to the dilution/mixing chamber or other structure or device. In one such embodiment, the valve frictionally engages the dilution/mixing chamber to releasably connect the valve thereto. In another exemplary embodiment, the valve and dilution/mixing chamber form cooperating threads to threadedly connect the valve to the dilution/mixing chamber, such as by rotatably connecting the valve to the dilution/mixing chamber. Further, the seal between the one-way valve and the fluid-receiving chamber may take any of numerous different configurations, or the valve and chamber may not include such a seal. Still further, the present invention may be used to store and dispense any of numerous different types of substances, to make any of numerous different types of products, including any of numerous different types of beverages, foods or other types of products. Similarly, the variable-volume storage chamber need not define a variable volume, and/or may be formed by any of numerous structures other than flexible pouches that are currently known, or that later become known. Still further, the pump need not be a peristaltic pump, but may be defined by any of numerous different types of pumps, that are electric or manually actuated (or foot actuated) that may or may not be assembled or formed integral with the one-way valve and/or an actuator for the valve. Accordingly, this detailed description of the currently preferred embodiments is to be taken in an illustrative as opposed to a limiting sense.

What is claimed is:

1. A valve connectable in fluid communication with a fluid-receiving chamber and forming a substantially fluid-tight seal therebetween, the valve comprising a relatively rigid valve seat, a relatively flexible valve member overlying the valve seat and forming an axially-elongated, normally-closed valve opening therebetween defining an inlet at one end of the valve seat, an outlet at an opposite end of the valve seat, and an axially-extending seal therebetween that forms a fluid-tight seal between the inlet and outlet of the normally-closed valve opening, an axially-extending valve body radially spaced relative to the valve member and forming a space therebetween allowing fluid-flow therethrough for cleaning the valve and fluid-receiving chamber, and a seal engageable with the fluid-receiving chamber and forming a substantially fluid-tight seal therebetween to seal the valve outlet and fluid-receiving chamber with respect to ambient atmosphere, wherein the valve member is movable radially away from the valve seat in response to substance at the inlet to the valve opening exceeding a valve opening pressure to flow into the normally closed valve opening, through the outlet, and into the fluid-receiving chamber.

2. A valve as defined in claim 1, further comprising a deflector extending axially beyond the outlet of the normally closed valve opening.

3. A valve as defined in claim 2, wherein the deflector extends axially beyond a distal end of the valve body.

4. A valve as defined in claim 2, wherein the deflector extends axially from the valve seat.

5. A valve as defined in claim 4, wherein the deflector defines a distal end and the valve body defines a distal end, and the distal end of the deflector either (1) extends axially about the same extent as the distal end of the valve body, or (2) extends axially beyond the distal end of the valve body.

6. A valve as defined in claim 4, wherein the deflector is substantially conical shaped.

7. A valve as defined in claim 1, wherein the valve member and the valve seat form an interference fit therebetween.

8. A valve as defined in claim 7, wherein the valve member and valve seat define a decreasing level of interference at the inlet relative to the outlet of the normally-closed valve opening.

9. A valve as defined in claim 8, wherein the valve member and valve seat define a progressively decreasing level of interference in the direction from the inlet to the outlet of the normally-closed valve opening.

10. A valve as defined in claim 1, wherein the valve member defines a first thickness at the inlet and a second thickness at the outlet that is less than the first thickness.

11. A valve as defined in claim 10, wherein the first thickness is at least about 1¼ times greater than the second thickness.

12. A valve as defined in claim 1, wherein the valve member defines a distal end, the valve body defines a distal end, and the distal end of the valve member is spaced axially inwardly relative to the distal end of the valve body.

13. A valve as defined in claim 7, wherein the valve body extends annularly about the valve member.

14. A valve as defined in claim 13, wherein the valve member extends annularly about the valve seat and includes a base located approximately at the valve opening or upstream of the valve opening, wherein the base extends radially between the valve seat and valve body.

15. A valve as defined in claim 14, wherein the base of the valve member defines a curvilinear surface extending substantially radially between the valve seat and valve body.

16. A valve as defined in claim 15, wherein the base includes a first curvilinear surface portion adjacent to the valve seat defined by a first radius, a second curvilinear surface portion adjacent to the valve body defined by a second radius, and wherein the first radius is greater than the second radius.

17. A valve as defined in claim 15, wherein the seal extends annularly about a distal end of the valve body.

18. A valve as defined in claim 17, wherein the seal is formed integral with the valve member.

19. A valve as defined in claim 17, wherein the valve member and seal are co-molded to the valve body.

20. A valve as defined in claim 18, wherein the valve member, seal, and valve body define a space that extends annularly along the valve member and radially between the valve member and valve body for receiving fluid therethrough for cleaning the valve.

21. A valve as defined in claim 1, wherein the chamber is a dilution chamber or a mixing chamber for receiving a perishable food product, the dilution chamber or mixing chamber and valve are subjected to a clean-in-place process involving elevated temperatures above ambient temperature and vacuum pressure, and the valve member is made of a material and is configured to define a valve opening pressure that is sufficiently high to maintain a hermetic seal between the valve member and valve seat during the clean-in-place process.

22. A valve as defined in claim 21, wherein the valve opening pressure is at least about 5 psi.

23. A valve as defined in claim 1, wherein the valve member is made of silicone.

24. A device including a valve as defined in claim 1 and a variable-storage chamber connected in fluid communication with the inlet.

25. A device as defined in claim 24, further comprising a flexible tube connected in fluid communication between the valve and variable-volume storage chamber.

26. A valve as defined in claim 1, further comprising a relatively flexible filler extending axially and radially between the valve member and valve body, wherein the valve member defines a first hardness that allows the valve member to flex outwardly relative to the valve seat in response to a substance at the valve inlet exceeding the valve opening pressure; and the filler defines a second hardness less than the first hardness for flexing with movement of the valve member and allowing the valve member to move substantially radially between normally closed and open positions and for substantially preventing debris and like substances from collecting between the valve member and body.

27. A valve as defined in claim 26, wherein the first hardness is within the range of about 25 A to about 70 A, and the second hardness is within the range of about 35 A to about 40 A.

28. A valve for storing a sterile food product hermetically sealed in a variable-volume storage chamber, and dispensing the sterile food product through the valve and into a dilution chamber or a mixing chamber, wherein the valve is connectable in fluid communication with the dilution chamber or mixing chamber and forms a substantially fluid-tight seal therebetween, the valve comprising: first means for forming a relatively rigid valve sealing surface; second means that is relatively flexible for overlying the first means and forming an axially-elongated, normally closed valve opening therebetween defining an inlet at one end of the first means, an outlet at an opposite end of the first means, and an axially-extending seal therebetween, and for moving radially away from the first means in response to sterile food product at the inlet exceeding a valve opening pressure to allow the sterile food product to flow into the normally closed valve opening, through the outlet, and into the dilution chamber or mixing chamber; third means for enclosing the first and second means that is radially spaced relative to the second means and extends axially adjacent to the second means for forming a space therebetween and allowing fluid-flow therethrough for cleaning the valve and the dilution chamber or mixing chamber; and fourth means engageable with the dilution chamber or the mixing chamber for forming a substantially fluid-tight seal therebetween and sealing the outlet and the dilution chamber or the mixing chamber with respect to ambient atmosphere.

29. A valve as defined in claim 28, wherein the first means is a valve seat, the second means is a valve member, the third means is a valve body, and the fourth means is a seal.

30. A device comprising a valve as defined in claim 29, and further comprising fifth means coupled in fluid communication with the inlet for storing multiple portions of the sterile perishable food product hermetically sealed with respect to ambient atmosphere.

31. A method comprising the following steps:
  i) providing a one-way valve connected in fluid communication with a variable-volume storage chamber storing therein a liquid that is hermetically sealed with respect to ambient atmosphere;
  ii) connecting the one-way valve in fluid communication with a dilution chamber or a mixing chamber, and forming a substantially fluid-tight seal between the one-way valve and the dilution chamber or the mixing chamber;
  iii) pressurizing a portion of the liquid from the variable-volume storage chamber to a pressure that exceeds a valve opening pressure of the one-way valve;
  iv) introducing the pressurized liquid into an inlet of a normally closed valve opening of the one-way valve;
  v) moving with the pressurized liquid a flexible valve member radially away from a relatively rigid valve seat of the one-way valve to open a normally-closed axially extending valve opening of the one-way valve;

vi) allowing the pressurized liquid to flow from the inlet, through the normally-closed axially extending valve opening and, in turn, through an outlet of the normally-closed valve opening and into the dilution chamber or the mixing chamber;

vii) upon passage of the pressurized liquid through the normally-closed valve opening, allowing the resilient flexible valve member to move radially into engagement with the valve seat to seal the normally-closed valve opening; and viii) maintaining the liquid in the variable-volume storage chamber sterile and hermetically sealed with respect to ambient atmosphere throughout the foregoing steps.

32. A method as defined in claim 31, wherein the liquid is a perishable food product.

33. A method as defined in claim 32, wherein the perishable food product is a milk product or a chocolate product.

34. A method as defined in claim 31, further comprising the steps of providing in combination a plurality of variable-volume storage chamber and one-way valve assemblies, and releasably connecting each one-way valve assembly to a respective dilution chamber or mixing bowl.

35. A method as defined in claim 34, wherein the providing step further includes providing in each variable-volume storage chamber a respective perishable liquid food product sealed therein with respect to ambient atmosphere.

36. A method as defined in claim 31, further comprising the step of frangibly connecting a cover to the one-way valve to protect the valve during handling prior to the connecting step.

37. A method as defined in claim 31, wherein the pressurizing step includes pressurizing the portion of the liquid to a pressure at or above a valve opening pressure.

38. A method as defined in claim 31, wherein the one-way valve defines an axially and radially extending space between the valve member and valve body, and the method further comprises the step of directing a flow of cleaning fluid through said space to clean the valve member and prevent the collection of residue thereon.

39. A method as defined in claim 31, further comprising providing a deflector on the valve and using the deflector to protect and prevent contact with the valve member.

40. A method as defined in claim 39, further comprising recessing a distal end of the valve member within an annular valve body to further protect the valve member.

* * * * *